May 19, 1959  B. CAMETTI ET AL  2,887,061
TOTALLY ENCLOSED CANNED MOTOR PUMP
Filed July 1, 1954  2 Sheets-Sheet 2

United States Patent Office 2,887,061
Patented May 19, 1959

2,887,061

TOTALLY ENCLOSED CANNED MOTOR PUMP

Benjamin Cametti and Arthur C. Hagg, Pittsburgh, Pa., assignors to Westinghouse Electric Corporation, East Pittsburgh, Pa., a corporation of Pennsylvania Application July 1, 1954, Serial No. 440,628

26 Claims. (Cl. 103—87)

Our invention relates, generally, to motor pump units and, more particularly, to motor pump units which are adapted to be mounted in completely sealed casings.

Such motor pump units are designed to operate in a system where the system pressure often is independent of the pressure produced by the pump and is extremely high in relation to atmospheric pressure. In addition to the high pressures involved in such a pumping system, the fluid is often corrosive, explosive, or otherwise of a dangerous nature. In such pumping systems there is established a substantially zero leakage allowance in order to eliminate the danger caused by leakage of the fluid. Under these conditions it has been the practice to design the motor unit so that it could be immersed in the pump fluid, thus eliminating the need for mechanical shaft seals and providing a pump with substantially zero leakage allowance.

There are many disadvantages to prior designs, especially when the fluid being pumped was at an elevated temperature and of low viscosity. Under these conditions, much difficulty has been experienced in attempting to lubricate the bearings with the pump fluid in which the motor unit was immersed. Additional difficulties were experienced in cooling the motor unit due to the elevated temperature of the pumped fluid.

In these prior designs, the stator assembly was usually isolated from the pumped fluid by a thin walled metal cylinder which was sealed at both ends to the motor end plates and passed through the motor air gap. In order to support this thin-walled cylinder the stator assembly was filled with oil and an external balance chamber used to equalize the pressure of the oil and the pumped fluid and thus support the thin-walled cylinder. This is undesirable due to the fact that when the bellows used in the balance chamber fails, the stator assembly is flooded with pumped fluid and much damage to the motor unit may result, as well as danger to the surrounding area due to the escape of the pumped fluid.

In our design we have provided a novel means for isolating the motor windings and eliminating the need for oil and a balance chamber to support the thin-walled cylinder used to isolate the stator windings. In addition, we have provided a unique cooling and lubricating system so that our motor pump unit can operate in a low-viscosity, high-temperature fluid without failure.

Accordingly, it is the principal object of our invention to provide a sealed motor pump unit of simplified construction having improved electrical efficiency and substantially zero leakage.

Another object of our invention is to provide a sealed motor pump unit with the stator windings isolated from the pump fluid by a unique one-piece structure capable of withstanding extremely high pressure.

Another object of our invention is to provide a sealed motor pump unit having a new thermal barrier for inhibiting the flow of heat from the pump unit to the motor unit.

Another object of our invention is to provide a sealed motor pump unit having a novel cooling system for the stator.

Another object of our invention is to provide a new means for substantially eliminating the axial thrust loads of a centrifugal type of pump.

Another object of our invention is to provide a sealed motor pump unit with a new type of simplified rotor construction of high electrical efficiency.

Another object of our invention is to provide a centrifugal type of pump with labyrinth type of internal shaft seals and wearing rings to control transfer or diffusion of fluid within the hermetic motor-pump unit.

These objects and other advantages of our invention will be apparent to one skilled in the art, and can be better understood from the following description of a preferred embodiment of our invention when taken in connection with the accompanying drawings, in which.

Figure 1:
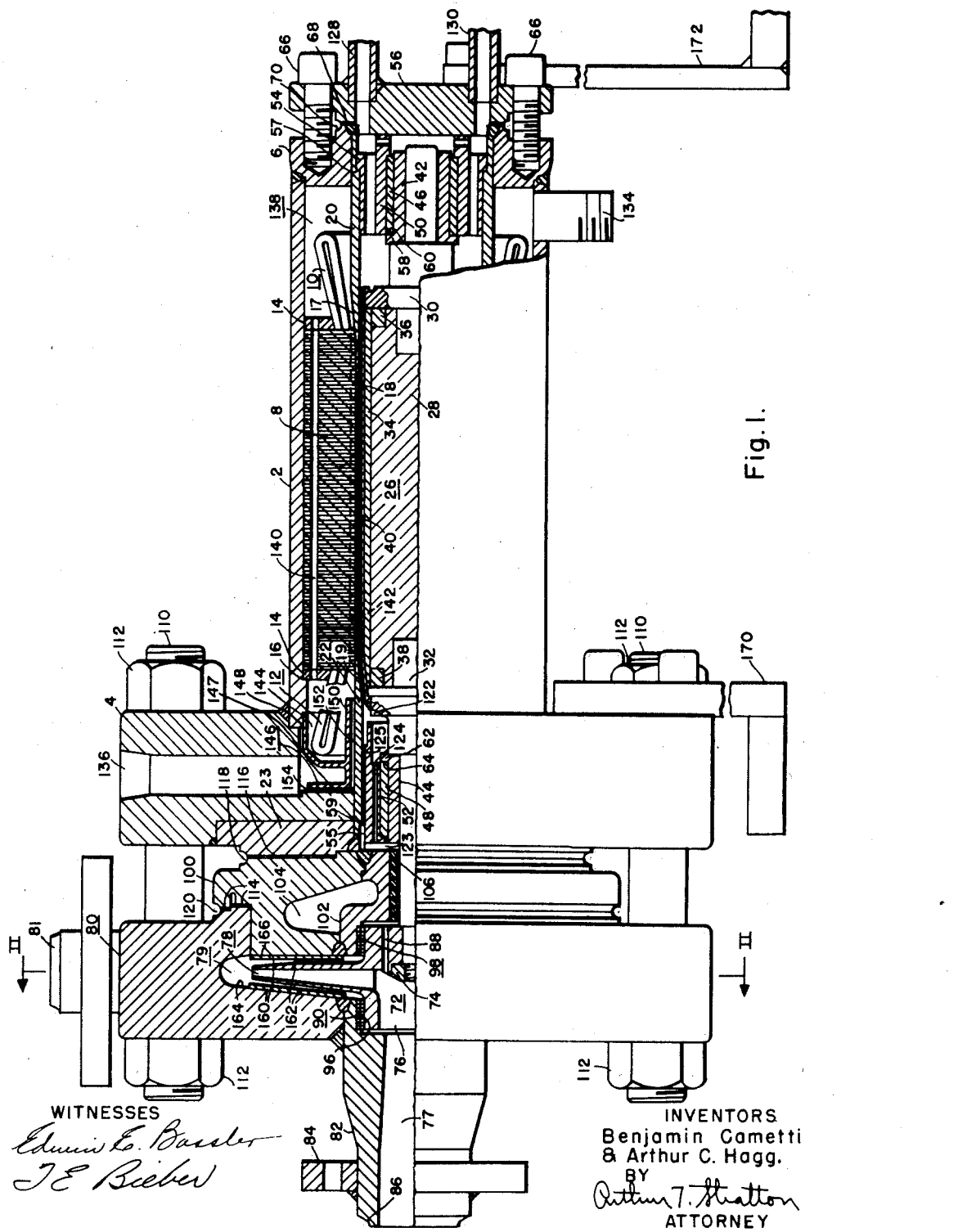
Figure 1 is a side elevation in partial longitudinal section of a motor-pump unit illustrating a preferred embodiment of our invention.

Referring now particularly to Fig. 1, which illustrates a preferred embodiment of our invention, there is shown a motor pump unit comprised, generally, of a motor unit having a stator and rotor with a pump unit attached to one end of the motor unit. The motor unit has a solid tubular motor frame 2 with annular end plates 4 and 6 attached to each end of the motor frame 2 by any suitable means, such as by welding. Inserted in the motor frame is a stator comprised of ring-shaped laminations 8, preferably of a magnetic material such as a magnetic steel, which are stacked between end plates 14. The stacked stator laminations 8 and end plates 14 are held together as a unit by any suitable means such as welding. Suitable stator windings are placed in inwardly opening slots (not shown) in the laminations 8 and have end turns 10 and 12 extending therefrom at each end, respectively.

The motor frame and stator of our motor pump unit is assembled in the following manner. First, a baffle member 146 is forced into one end of the tubular motor frame 2 until a flange 148 on baffle 146 rests against an inwardly projecting flange at one end of motor frame 2. Next, the motor end plate 4 is attached to the motor frame 2. The stator assembly containing the laminations 8, end plates 14 and windings is then inserted into the motor frame 2 from the opposite end until one end plate 14 rests against an inwardly projecting flange 16 on motor frame 2. The motor end plate 6 is then attached to the motor frame 2. The stator assembly is hermetically sealed in the motor frame 2 by a cylindrical member 18, preferably of a nonmagnetic corrosion resisting material such as stainless steel, which is sealed at each end to the motor end plates 4 and 6, respectively, by any suitable means such as welding. In order to maintain good electrical efficiency for the motor unit and yet provide the cylindrical member 18 with sufficient mechanical strength to withstand the system pressure, we have provided a thin-walled center section for the cylindrical member 18 of substantially the same length as the stator core. The center section gradually increases in wall thickness adjacent the ends of the stator laminations to relatively thick-walled end sections 20 and 22, respectively. The thick-walled end section 20 is connected to the center section of the cylindrical member 18 by an outwardly tapered section 17, while end section 22 is connected to the center section by an inwardly projecting tapered section 19.

Thus, the cylindrical member 18 will have an outer surface of uniform diameter from one end section 22 to the outwardly tapered section 17 and can be inserted into the opening in the stator assembly from the end of the motor unit adjacent the motor end plate 6. When the cylindrical member is inserted into the opening in the stator assembly its outwardly projecting tapered section 17 will act as a wedge in forcing the stator assembly into position against flange 16 on the motor frame 2 and retain it in position.

We have thus provided a motor unit with a stator hermetically sealed in the motor frame by means of a one-piece cylindrical member capable of withstanding full system pressure without additional supporting means. In addition, we have maintained good electrical efficiency for our motor unit by having the center section of the cylindrical member relatively thin where it passes through the motor air gap. The cylindrical member can have relatively thin walls in the center section because it will be supported by the stator laminations in this area and thus not require great mechanical strength. Also, we have provided relatively thick ends for our cylindrical member which, in addition to providing mechanical strength to withstand the system pressure, greatly facilitate the welding of the cylindrical member to the heavy annular end plates of the motor unit.

The rotor 26 of our motor unit is comprised generally of three pieces, a generally cylindrical rotor core 28, preferably of a magnetic material, such as magnetic iron, and two shaft extensions 30 and 32, preferably of a corrosion-resisting material, such as stainless steel. The shaft extensions 30 and 32 are attached to the rotor core 28 by any suitable means, such as by being shrunk-fit into recesses in each end of core 28. A suitable squirrel-cage winding, including longitudinally extending conductors 34, is positioned in suitable inwardly projecting slots on the outer periphery of the rotor core 28, and the conductors are attached at each end to annular rings 36 and 38, respectively, by any suitable means, such as soldering. The annular rings 36 and 38 are preferably of the same material as conductors 34, and are positioned in suitable grooves provided in the ends of the rotor core 28 before the shaft extensions 30 and 32 are attached to the rotor core. In order to isolate the rotor core 28 and the squirrel-cage winding from the pump fluid, a thin-walled cylindrical can 40, preferably of a non-magnetic material, such as stainless steel, is positioned over the outside diameter of the rotor and sealed at each end to the adjacent shaft extensions 30 and 32, respectively, by any suitable means, such as welding. The cylindrical member 40 can be maintained thin due to the fact that it is supported throughout its length by the squirrel-cage winding and the rotor core 28. Thus, due to its thin-walled section it does not impair the electrical efficiency of the motor unit since it does not increase the motor air gap any appreciable amount.

Bearing journals 42 and 44, preferably of a corrosion resisting material, such as stainless steel, are shrunk on rotor shaft extensions 30 and 32, respectively. Bearings 46 and 48, preferably of compressed material such as carbon-graphite, are either shrunk or pressed into bearing cartridges 50 and 52, respectively, and serve to rotatably mount the motor rotor 26 by means of the bearing journals 42 and 44. The bearing cartridges 50 and 52 also serve as bearing support members and have outwardly projecting radial flanges 54 and 55, respectively, which rest against suitable shoulders 57 and 59, respectively, on the inner periphery of the thick end sections 20 and 22 of the cylindrical member 18 used to isolate the stator windings. Bearing cartridge 50 is retained in place against the shoulder 57 by means of motor end cap 56, and the bearing cartridge 52 is maintained in place against the shoulder 59 by means of the thermal barrier member 100, to be described later. The rotor is located in an axial position in one direction by an outwardly projecting radial flange 58 on bearing journal 42 which runs in cooperation with one end surface 60 of journal bearing 46. The rotor is located in an axial position in the opposite direction by means of an outwardly projecting radial flange 62 on bearing journal 44 which runs in cooperation with the end surface 64 of journal bearing 48. The combination of the outwardly projecting flanges 58 and 62 and the end surfaces 60 and 64 are in effect a continuous ring type of thrust bearing of low capacity. Our motor pump units require only this simple thrust arrangement because we have eliminated substantially all of the axial thrust of our motor pump unit by a novel construction of the pump casing to be described later.

The motor end cap 56 which serves to both close one end opening in the motor unit and retain bearing cartridge 50 in place is secured to the motor end plate 6 by means of bolts 66 which pass through the end cap 56 and draw it into pressure-tight seal with the adjacent surface of motor end plate 6. A gasket 68 is placed between the adjacent surfaces of end plate 6 and end cap 56 in order to insure a pressure-tight seal. In cases where the motor pump is to be operated in a system having a substantial zero leakage allowance, the gasket 68 may be omitted and the end cap 56 may be welded to the end plate 6 by a small weld in the area 70. The weld in area 70 is not a structural weld but only a seal and thus may be easily broken when it is desired to disassemble the motor unit.

The pump unit of our invention has a hollow impeller 72 having a central suction inlet 76 and an annular discharge outlet 78. The impeller 72 is mounted on the shaft extension 32 of the rotor by means of nut 74, and serves to draw fluid in through the suction inlet 77 of the pump casing 80 and impel it radially outward through the discharge 78 into an annular area 79 of the pump casing 80 which surrounds the impeller, from which it flows out discharge outlet 81. The pump casing 80 is provided with an extension 82 on its suction inlet 77 which has a pipe flange 84 thereon for bolting the motor pump unit to the remainder of the system piping. Also provided on pump casing extension 82 is a pipe fitting 86 designed to be welded to a similar fitting in case it is desired to permanently seal the unit in the system piping. Longitudinal holes 88 are provided in the impeller 72 near the suction inlet so that the suction pressure of the impeller may have access to the opposite side of the impeller to partially compensate for the hydraulic unbalance of the single suction inlet of impeller 72.

The discharge pressure of the impeller 72 is prohibited from flowing back to the suction inlet 76 of the impeller by means of the labyrinth type shaft seal 90 (Fig. 3) located in the pump casing 80 adjacent the suction inlet 76 of the impeller. Labyrinth shaft seal 90 consists of a plurality of relatively thin washers 92 and spacing rings 94 which are inter-spaced between the washers 92. The inner diameter of washers 92 is slightly larger than the outer surface 96 of the impeller 72 in the region of suction inlet 76, so that they do not contact the surface 96 of the impeller. The washers 92 and spacers 94 are retained in the pump casing 80 by any suitable means, such as a press fit. The combination of washers 92 and spacers 94 form a labyrinth type seal having restricted passages for the pumped fluid, and annular shaped expansion areas inter-spaced between the restricted passages. A similar labyrinth seal 98 is provided for the opposite side of the impeller 72.

In our design of labyrinth seals 90 and 98, which replace the wearing rings usually found in centrifugal pumps, we maintain the washers 92 thin. Thus, in case the inner diameter of any washer comes in contact with the outer rotating surface 96 of the impeller, it will not seize and weld itself to the impeller but only wear a little and still continue to function as a seal. The problem of seizing of conventional wearing rings is especially troublesome where, due to the corrosive nature of the fluid being pumped, all of the pump parts must be made of a corrosion-resisting material, such as stainless steel. It is well known that the slightest surface contact between a rotating and a stationary member where both are made of stainleess steel will cause them to seize or weld together. We have solved this problem by maintaining the washers thin, thus their inner diameter will wear without seizing the rotating member in case they should come into contact. Our seals have proven to be very effective in preventing the escape of fluid from the discharge of the pump to the suction side of the pump and have required very little maintenance and in some cases no maintenance has been required.

In order to inhibit flow of heat from the pump unit to the motor unit, we have provided a novel thermal barrier. Our thermal barrier consists of outer and inner annular members 100 and 102, respectively, which are sealed together by any suitable means such as welding to enclose sealed annular area 104. Annular area 104 being a dead air space effectively inhibits the flow of heat from the fluid in the pump unit to the fluid in the motor unit. The annular members 100 and 102 are positioned between the pump casing 80 and the motor end plate 4 so that the thermal barrier surrounds the rotor shaft extension 32 and effectively separates the pump unit from the motor unit. In case it is desired to increase the effectiveness of the thermal barrier, the annular area 104 may be filled with any suitable insulating material such as glass wool.

The fluid in the pump unit is prevented from freely flowing into the motor unit by means of labyrinth seal 106 similar in construction to the labyrinth seal 90 described above and located on the inner surface of thermal barrier member 102 between the pump impeller 72 and the journal bearing 48. Labyrinth seal 106 prevents the fluid from freely flowing into the motor unit, but allows it to seep by so that the motor unit is completely filled with fluid at substantially full system pressure. Labyrinth seal 106 also substantially eliminates circulation of the fluid between the pump unit and motor unit and thus greatly reduces the transfer of heat from the fluid in the pump unit to the fluid in the motor unit.

A vent 128 is provided in the motor end cap 56 for venting any air entrapped in the motor unit so that it may be completely filled with fluid from the pump. Vent 128 is adapted to be sealed by means of a cap (not shown) which may be welded in place after the motor is vented of entrapped air. Also provided in end cap 56 is a drain 130, also adapted to be sealed by means of a welded cap (not shown) which is used to drain the motor unit in case it is desired to disassemble the motor pump unit.

The pump unit is attached to the motor unit by means of studs 110 and nuts 112 which serve to bolt the motor end plate 4 and the pump casing 80 together. A gasket 114 is placed between the adjacent surfaces of the pump casing 80 and annular member 100 of the thermal barrier, while gasket 116 is placed between the adjacent surfaces of annular member 100 and spacing ring 23 on motor end plate 4 to insure a pressure tight seal. In case it is desired to install the motor pump in the pumping system having a zero leakage allowance, the gaskets 114 and 116 may be omitted and both the pump casing 80 and the spacing ring 23 may be sealed to the annular member 100 of the thermal barrier by any suitable means, such as welding, in the areas 118 and 120 respectively. The motor unit can still be readily removed from the pump unit for servicing by breaking the weld in area 120 between the pump casing and the thermal barrier and removing the nuts 110 and the studs 112. The weld in area 120 is easily broken as it is not a structural weld but only a seal between the members. Thermal barrier 100 also serves to hold the bearing cartridge 52 in position against shoulder 59 as previously described.

The journal bearing 48 between the motor rotor and the pump unit is lubricated and cooled by the fluid contained in the motor unit, which is circulated by means of small vanes 122 formed on rotor shaft 32. The vanes 122 act as a centrifugal pump and circulate the fluid longitudinally through outer passageway 125 contained in the bearing cartridge 52 into annular area 123 which surrounds the rotor shaft 32 from which it returns to the vanes 122 by means of an inner longitudinal passageway 124 also contained in bearing cartridge 52. Part of the fluid in annular area 123 also flows past the radial bearing 48 thus lubricating it. The fluid by flowing through the longitudinal passageway 125 is effectively cooled by means of the cooling medium circulated through the stator assembly, to be described below, due to the small cross-section of longitudinal passages 124 which causes the fluid to circulate at a rapid rate.

The stator assembly of our motor unit is cooled by means of an external cooling media, preferably an insulating fluid, such as oil, which is admitted through inlet pipe 134 in the motor frame 2 adjacent motor end plate 6 and then flows through the stator assembly and out the pipe outlet 136 at the opposite end of the motor frame in end plate 4. The cooling media, upon entering the stator assembly through inlet 134, flows into annular area 138 where it circulates around the end turns 10 of the stator winding. After circulating around the end turns 10, the cooling media flows through a plurality of longitudinal passageways 140 near the outer periphery of the stator laminations 8 and a plurality of longitudinal passageways 142 near the inner periphery of the stator laminations 8. The passageways 140 and 142 have a small cross-section so that the cooling media will have considerable velocity when flowing through the stator laminations 8 and thus effectively cool the stator. That part of the fluid that flows through longitudinal passageways 140 flows into annular area 144, where it circulates around end turns 12 at the opposite end of the stator assembly, thus cooling them. This coolant then joins with the coolant that flows through longitudinal passageways 142 and flows through annular area 152 between the circular or annular baffle 150 and cylindrical member 18, and then out radial passageway 154 to the outlet 136. The radial passageway 154 and annular area 152 are formed by means of a circular or annular baffle 146 which has a general U shape in section with longitudinally projecting flanges from both ends of one leg of the U. One of these longitudinal flanges 150, in cooperation with the cylindrical member 18 which isolates the stator assembly from the fluid in the motor unit, serves to form annular area 152. The other flange 148 serves to locate the baffle and is attached to the motor frame 2 by any suitable means (not shown). The radial passageway 154 is formed by means of the other leg 147 of the U-shaped baffle and the adjacent surface of the motor end plate 4. By maintaining the cross-section of annular area 152 and passageway 154 small, the velocity of the cooling media through them is maintained high, which increases the effectiveness of the cooling media.

Journal bearing 46 runs completely flooded in a space filled with the fluid being pumped and is cooled and lubricated by this fluid. The rotating bearing journal 42 tends to draw the fluid between itself and bearing 46, thus lubricating and cooling the bearing 46.

By means of the cooling system described above, we have provided an external cooling medium on one side of the cylindrical member 18 in the area between the motor unit and pump unit and circulated the pumped fluid contained in the motor unit on the other side. Thus, the heat from the pump fluid is effectively transferred to the external cooling media due to the high velocities of both fluids in this area. It can thus be seen that the fluid circulated past radial bearing 48 acts as an effective cooling and lubricating agent. Our cooling system also has the advantage that none of the fluid being pumped is circulated externally, but only within the motor pump unit, thus reducing the possibility of its escape.

The motor pump unit is mounted by means of legs 170 and 172 which are attached to motor end plates 4 and 6 by any suitable means such as bolts (not shown).

Figure 2:
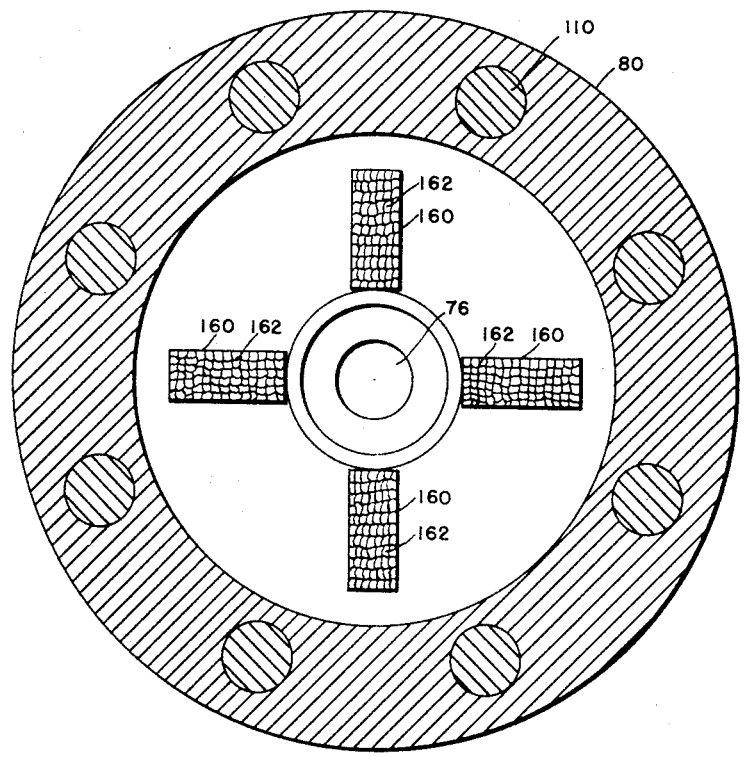
Fig. 2 is a sectional view of the unit shown in Fig. 1 taken substantially along the line II—II of Fig. 1 but omitting the pump impeller for clarity.
Figure 3:
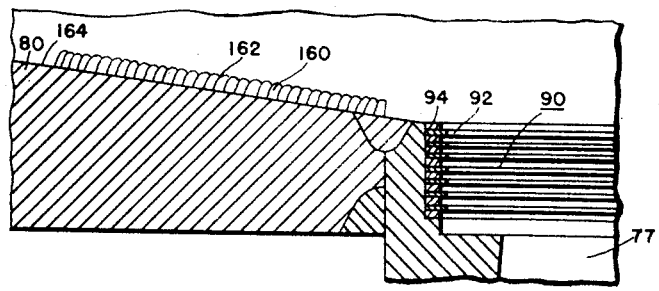
Fig. 3 is a partial, enlarged view of the labyrinth seal and adjacent thrust pad shown in Fig. 1 with the pump impeller omitted.

We have also provided a new and unique means for substantially reducing the axial thrust of our motor pump unit caused by the hydraulic unbalance of the single inlet impeller 72. Our means comprises a plurality of pads 160 (Fig. 3) attached to the inner radial surfaces 164 and 166 of pump casing 80 and having an irregular surface 162. The pads 160 may be made of the same material as the pump casing 80 and be provided with the irregular surface 162 by any suitable means such as shot blasting or knurling. In the embodiment of our invention shown in Fig. 1, the pads consist of a series of substantially parallel welding beads as shown in Figs. 2 and 3 spaced so that adjacent beads overlie slightly and project. In so manufacturing the pads, we have provided them with an irregular surface 162 and attached them to the surfaces 164 and 166 of the pump casing by the same operation.

We adjust the number, size and location of the thrust pads 160 so that at full capacity of the motor pump unit the axial thrust load never reaches a magnitude where provision must be made for its absorption by the use of conventional thrust bearings. As an example, a motor pump unit constructed in the manner illustrated in Fig. 1 was rated at 100 gallons per minute at 100 pounds per square inch and had a 300 pound axial thrust in the direction of the suction inlet before our thrust pads 160 were installed. In order to substantially eliminate this thrust load, we installed four thrust pads 160 extending approximately from the inner diameter to the outer diameter of the pump casing 80 as shown in Fig. 2 on both radial surfaces 164 and 166 of the pump casing 80. The installation of these pads reduced the 300 pound axial thrust to a maximum of 30 pounds. We prefer to install our thrust pads on both radial surfaces of the pump casing, although we have installed them on only one radial surface, preferably the surface on the same side of the pump casing as the direction of the axial thrust, radial surface 166 for the embodiment shown in Fig. 1, and achieved a substantial reduction in the axial thrust load. We observed that when the thrust pads were installed on only one radial surface the thrust load varied over a much greater range with changes in the rate of flow of the pump than when they were installed on both radial surfaces. Of course, the installation of the thrust pads on only one surface could be designed so that for any given rate of flow of the pumps, for example full capacity, the thrust load would be substantially zero.

We have provided for the small axial thrust loads that may occur in our motor pump unit by the shoulders 58 and 62 on the bearing journals 42 and 44, respectively, which run against the end surfaces 60 and 64 of journal bearings 46 and 48, respectively. Before we installed the thrust pads described above, the end surfaces 60 and 64 of the journal bearings often failed in service due to overloads caused by excessive axial thrust.

The above arrangement for substantially reducing the axial thrust, or eliminating it entirely, is easily manufactured and requires no maintenance. The lack of maintenance is very important in a pump designed to operate in a sealed system pumping highly dangerous and explosive fluids. In addition to the above advantages, our thrust pads cost considerably less to manufacture than conventional type thrust bearings.

We have further increased the reliability of our motor pump unit by providing the novel thermal barrier described above, which inhibits the flow of heat from the fluid in the pump casing to the fluid in the motor unit. In addition, we have provided a stator cooling system having an efficient baffling arrangement and utilizing an external cooling medium. By providing circulation of the fluid in the motor unit around and through the journal bearing adjacent to the pump unit in combination with the thermal barrier and stator cooling system mentioned above, we have operated our motor pump units in fluids having a temperature of 600° F. without injuring the motor or its windings. By eliminating the need for external heat exchangers, we simplified the construction of our motor pump unit and decreased the possibility of fluid escaping, since none of the fluid being pumped is circulated outside of the unit's outer casing except in the system piping.

The use of our novel labyrinth type of seals for shaft seals and wearing rings increased the reliability of our motor pump unit over previous designs, because they require little or no maintenance. All previous shaft seals and sealing rings for centrifugal pump units require replacement at periodic intervals due to wear and are subject to scoring or seizing in case they come in contact with the rotating member.

From the foregoing description of our invention, it may be seen that many changes and modifications may be made without departing from the broad spirit and scope thereof. Accordingly, it is intended that the embodiment of our invention described in detail herein be interpreted in an illustrative, rather than in a limiting sense.

We claim as our invention:

1. A hermetically sealed motor pump unit comprising an electric motor having a solid tubular motor frame adapted to be closed at one end, a stator core and windings, means for hermetically sealing said stator core and windings in the motor frame, said means comprising a cylindrical member with substantially thicker wall sections at each end than in the area adjacent the stator core positioned on the inner surface of said stator core, said cylindrical member being hermetically sealed at each end to the motor frame, a rotor having shaft extensions at opposite ends rotatably mounted in said motor frame, a rotary pump impeller mounted on the shaft extension opposite the closed end of said motor frame, a casing for said impeller, said casing being hermetically sealed to the other end of said motor frame, means for establishing fluid communication between said casing and the opening in said cylindrical member thereby immersing the rotor in the pumped fluid at substantially full system pressure, additional means for circulating a cooling media through said stator and its windings to cool said electric motor, said additional means comprising an inlet for the cooling media at one end of the motor frame, longitudinal passages through said stator core, an annular baffle having a U-shaped cross section positioned on the inner surface of said motor frame adjacent the other end of said stator and radially spaced from said cylindrical member, circular flanges projecting from opposite ends of one of the legs of said U-shaped baffle to partly enclose the end turns of said stator windings at said other end of the stator, and an outlet at said other end of said motor frame for said cooling media.

2. A hermetically sealed motor pump unit comprising an electric motor having a solid tubular motor frame adapted to be closed at one end, a stator core and windings, means for hermetically sealing said stator core and windings in the motor frame, said means comprising a cylindrical member with substantially thicker wall sections at each end than in the area adjacent the stator core positioned on the inner surface of said stator core, said cylindrical member being hermetically sealed at each end to the motor frame, a rotor having shaft extensions at opposite ends rotatably mounted in said motor frame, a rotary pump impeller mounted on the shaft extension opposite the closed end of said motor frame, a casing for said impeller, said casing being hermetically sealed to the other end of said motor frame, means for establishing fluid communication between said casing and the opening in said cylindrical member thereby immersing the rotor in the pumped fluid at substantially full system pressure, additional means for circulating a cooling media through said stator core and its windings to cool said electric motor, said additional means comprising an inlet for the cooling media at one end of the motor frame, longitudinal coolant passages on the inner and outer peripheries of said stator core, an annular baffle U-shaped in section positioned on the inner surface of said motor frame adjacent the other end of said stator core and radially spaced from said cylindrical member, circular flanges projecting from opposite ends of one of the uprights of said U-shaped baffle to partly enclose the end turns of said stator windings at said other end of the stator, and an outlet at the other end of said motor frame for said cooling media.

3. A hermetically sealed motor pump unit comprising an electric motor having a solid tubular motor frame adapted to be closed at one end, a stator core and winding hermetically sealed in said motor frame, said stator having a circular opening for receiving a rotor, a rotor having shaft extensions at opposite ends rotatably mounted in said motor frame, a rotary pump impeller mounted on the shaft extension opposite the closed end of said motor frame, a pump casing for said rotary pump impeller, said pump casing being hermetically sealed to the other end of said motor frame, means for establishing fluid communication between said pump casing and said stator opening whereby said rotor is immersed in the pumped fluid at substantially full system pressure, a thermal barrier comprising a sealed annular cavity free of pumped fluid surrounding the shaft extension on which the rotary pump impeller is mounted and being positioned between said impeller and said rotor.

4. A hermetically sealed motor pump unit comprising an electric motor having solid tubular motor frame adapted to be closed at one end, a stator core and winding hermetically sealed in said motor frame, said stator core having a circular opening for receiving a rotor, a rotor having shaft extensions at opposite ends rotatably mounted in said motor frame, a rotary pump impeller mounted on the shaft extension opposite the closed end of said motor frame, a pump casing for said rotary pump impeller, said pump casing being hermetically sealed to the other end of said motor frame, means for establishing fluid communication between said pump casing and said stator core opening whereby said rotor is immersed in the pumped fluid at substantially full system pressure, a thermal barrier comprising a sealed annular cavity filled with a heat insulating material and free of pumped fluid, said thermal barrier surrounding the shaft extension on which the rotary pump impeller is mounted and being positioned between said pump impeller and said rotor.

5. A hermetically sealed motor pump unit comprising an electric motor having a solid tubular motor frame adapted to be closed at one end, a stator core and winding hermetically sealed in said motor frame, said stator core having a circular opening for receiving a rotor, a rotor having shaft extensions at opposite ends rotatably mounted in said motor frame, a rotary pump impeller mounted on the shaft extension opposite the closed end of said motor frame, a pump casing for said rotary pump impeller, said pump casing being hermetically sealed to the opposite end of said motor frame, the fluid on the discharge side of said rotary pump impeller being isolated from the fluid on the suction side of said rotary pump impeller by means of a labyrinth seal located in the pump casing adjacent the outer surface of said impeller, said labyrinth seal comprising a series of thin washers interspaced between relatively heavy rings, the inner diameter of said thin washers being slightly larger than the outer diameter of the impeller adjacent said thin washers, and the inner diameter of said relatively heavy rings being substantially larger than the inner diameter of said thin rings.

6. A hermetically sealed motor pump unit comprising an electric motor having a solid tubular motor frame adapted to be closed at one end, a stator core and winding hermetically sealed in said motor frame, said stator core having a circular opening for receiving a rotor, a rotor having shaft extensions at opposite ends rotatably mounted in said motor frame, a rotary pump impeller mounted on the shaft extension opposite the closed end of said motor frame, a pump casing for said rotary pump impeller, said pump casing being hermetically sealed to the other end of said motor frame, means for establishing fluid communication between said pump casing and said stator opening whereby said rotor is immersed in the pumped fluid at substantially full system pressure, additional means for reducing the axial thrust comprising a plurality of pads having irregular surfaces, said pads being spaced circumferentially around the radial surfaces of the aforementioned pump casing.

7. A hermetically sealed motor pump unit comprising an electric motor having a solid tubular motor frame adapted to be closed at one end, a stator core and winding hermetically sealed in said motor frame, said stator having a circular opening for receiving a rotor, a rotor having shaft extensions at opposite ends rotatably mounted in said motor frame, a rotary pump impeller mounted on the shaft extension opposite the closed end of said motor frame, a pump casing for said rotary pump impeller, said pump casing being hermetically sealed to the other end of said motor frame, means for establishing fluid communication between said pump casing and said stator opening whereby said rotor is immersed in the pumped fluid at substantially full system pressure, additional means for reducing the axial thrust comprising a plurality of pads having irregular surfaces, said pads comprising a series of closely spaced weld beads spaced so as to overlay slightly and forming a substantially rectangular pad, said pads being spaced circumferentially around the radial surfaces of the aforementioned pump casing.

8. An electric motor comprising a tubular motor frame having annular end plates at opposite ends, a rotor rotatably mounted in said motor frame, a stator core and windings adapted to be inserted in said motor frame, a cylindrical member for hermetically sealing said stator core and windings in said motor frame, said cylindrical member having a thin walled center section and heavier walled sections at both ends, said end sections being formed integral with said center sections one of said end sections being connected to the center section by an inwardly projecting tapered walled section, the other of said end sections being connected to the center section by an outwardly projecting tapered walled section, said outwardly projecting tapered walled section wedging said stator core against an inwardly projecting flange on said motor frame and permitting the sliding of said rotor into said motor frame from one end, and said cylindrical member being hermetically sealed at each end to the adjacent motor end plate, thereby providing an electric motor having a stator hermetically sealed in its motor frame by means of a one-piece structure which allows assembly of the motor parts.

9. An electric motor comprising a tubular motor frame having annular end plates at opposite ends, a rotor rotatably mounted in said motor frame, a stator core and windings hermetically sealed in said motor frame, a cooling system for said stator core and windings, said cooling system comprising an inlet for a cooling media in said motor frame adjacent one of said motor end plates, longitudinal passages in said stator core so that said cooling media may flow through said stator core, an annular baffle having a U-shaped cross section positioned on the inner surface of said motor frame adjacent the other of said motor end plates with the legs of said U-shaped baffle extending radially outward, circular flanges projecting from opposite ends of one of the legs of said U-shaped baffle to partly enclose the adjacent end turns of said stator windings, and an outlet in said motor frame for said cooling media connecting with the radial passageway between the other leg of said baffle and the other of said motor end plates.

10. A centrifugal pump comprising a circular pump casing, a rotary pump impeller rotatably mounted in said pump casing, means for reducing the axial thrust of said rotary pump impeller comprising a plurality of pads having irregular surfaces, said pads being spaced circumferentially around the radial surfaces of said pump casing.

11. A centrifugal pump comprising a circular pump casing, a rotary pump impeller rotatably mounted in said pump casing, means for reducing the axial thrust of said rotary pump impeller comprising a plurality of pads, said pads being spaced circumferentially around the radial surfaces of said pump casing.

12. In a motor-pump unit adapted for pumping fluid at elevated temperatures and having a generally tubular housing adapted to be closed at one end thereof, a generally tubular stator assembly in said housing, a rotor mounted for rotation within said assembly, and an impeller and pumping casing therefor secured to said rotor and to the open end of said motor housing respectively; the combination comprising a tubular supporting member inserted through said stator assembly and secured at its respective ends to said motor housing, said supporting member forming a chamber for said rotor and communicating with the interior of said pump casing, and an annular baffle of generally U-shape cross-section mounted within the annular space formed between said supporting member and said motor housing and disposed adjacent said pump casing, said baffle having flanges projecting therefrom and disposed to partly enclose the end turns of said stator assembly.

13. In a sealed motor-pump unit adapted for pumping fluid at elevated temperatures and having a generally tubular motor housing adapted to be closed at one end, a stator and rotor mounted within said housing, a pumping casing secured to the open end of said motor housing and an impeller disposed in said casing and secured spacedly to said rotor; means for impeding the flow of heat from said pump casing to said motor housing, said means being disposed between said casing and said housing and comprising an annular member which encloses a sealed annular cavity and surrounds said shaft at a position between said rotor and said impeller.

14. A sealed motor-pump unit comprising an electric motor having a generally tubular motor frame adapted to be closed at one end, a stator core and winding sealed in said motor frame, said stator core having an opening for receiving a rotor, a rotor having shaft extensions at opposite ends rotatably mounted in said frame, a pump impeller mounted on the shaft extension opposite the closed end of said frame, a pump casing for said impeller, said casing being sealed to the other end of said frame and means for establishing limited fluid communication between said pump casing and said rotor, said means comprising a flow limiting seal surrounding the shaft extension on which said impeller is mounted, said seal being positioned on said last-mentioned shaft extension between said impeller and said rotor and having a plurality of relatively closely spaced substantially parallel transverse grooves disposed along the length of said last-mentioned extension with the narrow ridges formed between said grooves having an inner diameter slightly larger than the outer diameter of said shaft extension.

15. In a dynamoelectric device having a housing, a stator assembly mounted within said housing and a rotor mounted for rotation adjacent said assembly; means for sealing said stator assembly from said rotor, said means comprising a generally tubular member inserted through said stator assembly and closely fitting the bore thereof, said tubular member terminating in a thickened portion connected thereto by an outwardly tapering section, said housing having an inwardly projecting flange disposed adjacent said outwardly tapered section, said outwardly tapered section wedging said stator assembly against said inwardly projecting flange and permitting sliding of said rotor into said tubular member from an end of said housing.

16. In a dynamoelectric machine having a generally tubular housing, a generally tubular stator mounted within said housing, and a rotor mounted for rotation interiorly of said stator assembly; shielding means for the end turns of said stator assembly, said shielding means including a generally annular baffle positioned at the inner surface of said housing, said baffle in cross-sectional configuration including a pair of spaced leg members and a transverse portion connecting said leg members, and circular flanges projecting from opposite end portions, respectively, of one of said baffle legs, said flanges being disposed to partly enclose the adjacent end turns of said stator windings.

17. A centrifugal pump comprising a generally circular pump casing, a pump impeller rotatably mounted within said pump casing, and means for reducing the axial thrust of said pump impeller, said means comprising a plurality of pads spaced circumferentially around a radial surface of said pump casing and each including a plurality of closely spaced beads secured to said surface.

18. In a motor-pump unit having a motor housing, a hollow stator assembly mounted within said housing, a rotor and shaft mounted for rotation within said stator assembly, and a pump casing and impeller secured to said housing and to said shaft in spaced relationship to said rotor, respectively; the combination comprising tubular supporting means for at least partially supporting said stator assembly and for enclosing said stator, said means communicating with the interior of said pump casing, and flow limiting means arranged to provide limited flow of fluid from said pump casing to said tubular means, said flow limiting means surrounding said shaft at a location between said rotor and said impeller and including a plurality of relatively thin washers and a plurality of relatively thick spacing rings, said rings being interleaved with said washers, and the inner diameter of said washers being slightly larger than the outer diameter of said shaft with the inner diameter of said rings being larger than the inner diameter of said washers.

19. In a motor-pump unit including a pump casing, an impeller rotatably mounted within said casing and a motor housing joined to said casing and having a stator and rotor mounted therewithin; means for partially isolating the fluid on the discharge side of said impeller from the fluid on the suction side thereof and for partially isolating the fluid on said discharge side from said motor housing, said means including a flow-limiting seal located in said casing at each side of said impeller and adjacent the outer surface thereof, said flow-limiting seals each comprising a plurality of relatively thin washers and spacing rings inserted between adjacent ones of said washers, said washers and said rings being mounted within said pump casing adjacent said impeller, and said washers each having an inner diameter slightly larger than the adjacent outer diameter of said impeller.

20. In a motor-pump unit including a pump casing, an impeller rotatably mounted within said casing and a motor housing joined to said casing and having a stator and rotor mounted therewithin; means for partially isolating the fluid on the discharge side of said impeller from the fluid on the suction side thereof and for partially isolating the fluid on said discharge side from said motor housing, said means including a flow-limiting seal located in said casing at each side of said impeller and adjacent the outer surface thereof, said flow-limiting seals each comprising a plurality of inwardly extending continuous relatively thin projections mounted in said pump casing adjacent said impeller, and means for spacing said projections, the inner diameter of said projections being slightly larger than the adjacent outer diameter of said impeller.

21. In a rotative machine comprising a sealed housing, a shaft mounted for rotation within said housing, and means for dividing said housing into at least two discrete areas differing in pressure levels; flow-restricting means associated with said dividing means, said flow-restricting means including a plurality of relatively thin washers and spacing rings inserted between adjacent ones of said washers, said washers and said rings being mounted adjacent said shaft, and said washers each having an inner diameter slightly larger than the adjacent outer diameter of said shaft to provide a limited flow of fluid along said shaft from a region of higher pressure in said housing to a region of lower pressure therein.

22. A centrifugal pump comprising a generally circular pump casing, a pump impeller rotatably mounted within said pump casing, and means for reducing the axial thrust of said pump impeller, said means comprising a plurality of closely spaced beads spaced circumferentially and secured to a radial surface of said pump casing.

23. In a dynamoelectric machine having a generally tubular housing, means mounted in said housing for dividing said housing into high and low temperature areas, a stator assembly having windings and mounted in the low temperature area of said housing, and a rotor mounted for rotation within said assembly; the combination comprising a generally tubular supporting member inserted through said stator assembly and secured at its respective ends to said housing, said supporting member forming a rotor chamber, said stator assembly fitting relatively closely with an interior wall of said housing and in addition having a plurality of coolant flow passages extending substantially longitudinally through said stator assembly, conduit means communicating with the annular space between said supporting member and said housing for circulating a coolant medium through said passages, and flow directing and thermal insulating means mounted between said high temperature area and those end turns of said stator windings which are disposed adjacent to said high temperature area.

24. In a dynamoelectric machine having a generally tubular housing, means for dividing said housing into high and low temperature areas, a stator assembly having windings and mounted in the low temperature area of said housing, and a rotor mounted for rotation within said assembly; the combination comprising a generally tubular supporting member inserted through said stator assembly and secured at its respective ends to said housing, said supporting member forming a rotor chamber, said stator assembly fitting relatively closely with an interior wall of said housing and in addition having a plurality of coolant flow passages extending substantially longitudinally therethrough, conduit means communicating with the annular space formed between said supporting member and said housing for circulating a coolant medium through said passages, and flow directing and thermally insulating means mounted between said high temperature area and those end turns of said stator windings which are disposed adjacent to said high temperature area, said last mentioned means including a pair of spaced flanges which together partially surround said end turns for directing said coolant medium around said end turns and through said coolant passages, said last mentioned means in addition including a pair of spaced leg members interposed between said end turns and said high temperature area, said leg members defining a relatively stagnant volume of said coolant medium disposed generally in the path of heat conduction between said end turns and said high temperature area.

25. In a dynamoelectric machine having a generally tubular housing, a hollow stator assembly mounted with said housing, a rotor and shaft assembly mounted for rotation within said stator; means for dividing said housing into high and low temperature areas and for permitting pressure equalization between said areas, said stator and rotor being mounted in said low temperature area, said means comprising an annular member which encloses a sealed annular cavity and surrounds said shaft at a position between said high and said low temperature areas and flow limiting means mounted on the inner periphery of said annular member and disposed in proximity to said shaft, said flow limiting means including a plurality of inwardly extending continuous relatively thin projections, the inner diameter of said projections being slightly larger than the adjacent outer diameter of said shaft.

26. In a motor-pump unit including a pump casing, an impeller rotatably mounted within said casing and a motor housing joined to said casing and having a stator and rotor mounted there within, means for partially isolating the fluid on the discharge side of said impeller from the fluid on the suction side thereof and for partially isolating the fluid on said discharge side from said motor housing, said means including a flow-limiting seal located in said casing at each side of said impeller and adjacent the outer surface thereof, said flow limiting seals each including a plurality of relatively thin inwardly extending projections axially spaced along said impeller, each of said projections being circumferentially continuous with its inner diameter slightly larger than the outer diameter of said impeller, and means for spacing said projections.

References Cited in the file of this patent

UNITED STATES PATENTS

| Number | Name | Date |
|---|---|---|
| 1,020,699 | Kieser | Mar. 19, 1912 |
| 2,120,914 | Vogel | June 14, 1938 |
| 2,301,063 | McConaghy | Nov. 3, 1942 |
| 2,359,215 | Gold | Sept. 26, 1944 |
| 2,400,891 | Sigmund | May 28, 1946 |
| 2,497,650 | Anderson | Feb. 14, 1950 |
| 2,517,233 | Peters | Aug. 1, 1950 |
| 2,568,548 | Howard | Sept. 18, 1951 |
| 2,654,848 | Schaefer | Oct. 6, 1953 |
| 2,687,695 | Blom et al. | Aug. 31, 1954 |

FOREIGN PATENTS

| Number | Country | Date |
|---|---|---|
| 100,858 | Great Britain | July 20, 1916 |
| 204,956 | Switzerland | Mar. 31, 1939 |
| 386,931 | Great Britain | Jan. 26, 1933 |
| 463,015 | Great Britain | Mar. 19, 1937 |
| 666,608 | France | May 27, 1929 |
| 688,174 | Germany | Feb. 14, 1940 |
| 716,437 | France | Oct. 6, 1931 |